006
United States Patent Office 2,781,076
Patented Feb. 12, 1957

2,781,076

ARC RESISTANT LAMINATE

Alfred W. Kehe, Berkley, Ill., assignor to The Richardson Company, Melrose Park, Ill., a corporation of Ohio No Drawing. Application December 8, 1954,
Serial No. 474,038

9 Claims. (Cl. 154—2.6)

This invention relates to laminated products formed from filler materials impregnated with resinous compositions, and, more particularly, to products of this type which have improved resistance to arc tracking.

As is well known to those familiar with the field of industrial laminates, numerous laminated products have been developed having a wide variety of characteristics and properties depending on their end use. The usual method of making such laminated products comprises initially impregnating a sheet of suitable fibrous filler material such as paper, fabric, etc. with a partially polymerized resin to form a single ply, followed by superimposing a plurality of such plies to obtain a given thickness and subjecting the assembly to heat and pressure to cure the resin and unite the laminae. The resultant article usually is a hard broadlike structure and can be punched or otherwise fabricated into desired shapes.

An important use for such a material is in the electrical field as insulation for switches, relays, terminal blocks, etc. Thus, metal parts forming components of an electrical assembly can be readily attached to the aforementioned laminates in any predetermined pattern or manner and other circuit components may be electrically connected thereto by soldering, wiring, etc. Because of the trend toward high voltage operation, for example in the television field, more stringent electrical properties are required of the insulation material which is used in the corresponding assemblies.

One electrical characteristic which has become increasingly important is that of arc resistance, sometimes referred to as resistance to arc tracking. As a result of high voltages which are currently used with equipment of the aforementioned type, there is more chance for the creation of an arc between circuit elements which are attached to or separated by an insulation medium and which are in close relationship. If the insulation medium has poor arc resistance, it is possible that upon creation of an arc between circuit elements the surface of the insulation medium will be so affected as to cause a complete breakdown, whereby there will be created an electrical conducting path between elements. The creation of such an electrical conducting path as the result of arcing will, accordingly, eliminate the effect of insulation between the elements and may serve instead as the substantial equivalent of a direct connection between elements. Additionally, failure of the insulation medium between electrical components used in high voltage operations may create a serious fire hazard.

Accordingly, it is the main object of this invention to provide an improved laminate having a high arc resistance and good fabricating qualities, while maintaining the other electrical and physical properties normally required of such laminates.

Another object is to provide a laminate of the above type which has improved flame resistance.

A further object is the provision of a laminate having improved arc and flame resistance wherein the additional cost for the added properties is negligible.

The foregoing objects are accomplished in accordance with the teachings of this invention, by forming a laminate from a plurality of superimposed fibrous filler layers impregnated with a phenolic resin wherein the outermost lamina is provided with a resinous coating consisting essentially of polymerized butylated melamine formaldehyde, butylated urea formaldehyde, or a mixture thereof. In order to further improve the product, a flame retarding agent is also incorporated into the various laminae.

The use of the foregoing resins to obtain a product having a high arc resistance resulted from experiments with numerous other commercially available materials, all of which were discarded for one reason or another. Thus, for example, it was found that an unmodified melamine formaldehyde or unmodified urea formaldehyde might be applied as a coating to a base stock to obtain to some extent resistance to arc tracking. However, the use of such compounds resulted in laminated products having rather brittle surfaces which were not suitable for punching or similar fabrication. Additionally, such unmodified compounds were not found to be readily compatible with the preferred flame resistant ingredients which were required. Further, laminates formed from a combination of a fibrous filler impregnated only with phenolic type resins gave a stock which had reasonably good fabricating qualities, but very poor resistance to arc tracking. As a result of the present invention it was discovered that the aforementioned butylated melamine formaldehyde, butylated urea formaldehyde or mixtures thereof when used in association with the surface laminae, not only resulted in laminates having high resistance to arc tracking but also resulted in materially enhancing the fabricating qualities of laminates, especially when subjected to a punching operation. Additionally, it was discovered that these resinous compounds have very good compatibility with the phenolic resins used to impregnate the filler stock.

Butylated melamine formaldehyde, formed by reacting melamine, formaldehyde and butanol, together in a reaction vessel using well known processes, is commercially available under such names as Monsanto's Resimine 875 and American Cyanamides' Melmac 245-8. Butylated urea formaldehyde may be similarly formed and is presently being supplied by Monsanto under their trademark Resimine U–901. A commercially available mixture of the two resins is Uformite F–21 supplied by Rohm and Haas Company.

In forming a laminated product of the type contemplated by this invention, any appropriate fibrous filler material may be employed, for example, white rag paper, kraft paper, etc. This filler material, in sheet form, is initially passed through an impregnating bath comprising a heat curable phenolic resin containing a compatible flame retardant, at room temperature followed by subjecting the sheet to a drying operation at elevated temperature, wherein the volatiles are removed and the phenolic resin is partially cured. The type of phenolic resin can, of course, be varied to obtain desired characteristics. The term "phenolic resin" used herein is intended to include phenol formaldehyde resin, or a resin formed from a reaction mixture comprising either phenol, cresols, xylenols or mixtures thereof, together with formaldehyde or similar aldehydes.

The foregoing impregnated material may be cut into desired sheet sizes and stacked to obtain a base or core of a given thickness. However, to obtain a finished product having the previously mentioned high arc resistant characteristics, a surface lamina containing one of the compositions specified herein above must be laminated to this core. The surface layer is formed by passing a sheet of fibrous filler which has been impregnated with a phenolic resin in the above manner through a bath comprising, for example, butylated melamine formaldehyde varnish containing a flame retardant, followed by subjecting the impregnated sheet to a further drying operation. This sheet is then cut into desired sizes consistent with the size of the built-up core and placed thereon for simultaneous curing under heat and pressure to form a consolidated product.

Application to a built-up core of a surface sheet comprising a fibrous filler impregnated only with butylated melamine formaldehyde or butylated urea formaldehyde was tried and, while found to give a laminate having increased arc resistance, proved not completely satisfactory as evidenced by tests showing less than maximum electrical properties. It is believed that the reason for the apparent difference in properties is due to the fact that resins of the butylated melamine formaldehyde type do not have the ability to impregnate the filler to the extent of the impregnating phenol type resins and hence the fibers of the filler are not completely encased in the resin. Thus, it is preferred to form the surface lamina by the aforementioned two coat operation wherein the filler is first impregnated with a partially cured phenolic resin and subsequently treated with the arc resistant composition of this invention.

To impart enhanced flame resistance to the laminate an appropriate flame retardant such as tricresyl phosphate or triethyl phosphate may be placed in either the impregnating phenolic resin varnish and/or the arc resistant varnish. A flame retarding additive of the foregoing type is preferred for the reason that it also serves as a plasticizer for the surface coating.

An exemplary formula for a varnish which may be employed to form arc and flame resistant laminates in accordance with the present invention is the following, having a specific gravity of .960–.965.

| | Percent |
|---|---|
| Resin (Resimine #875—Monsanto) | 70.5 |
| Solvent (50/50 butylalcohol-benzol) | 25.0 |
| Tricresyl phosphate | 4.2 |
| Stearic acid | .3 |

Resimine 875 is supplied commercially as a 50% solids solution, the solvent being composed of equal parts of xylol and butanol. The tricresyl phosphate amounts to approximately 6% of the Resimine 875. Stearic acid in the amount indicated serves as a lubricant to prevent sticking of the laminates to the press plates. Constant stirring is employed in mixing the ingredients of the varnish and the varnish should be heated to about 100° F. during the addition of the stearic acid. Before applying the varnish to a filler stock it should be cooled to room temperature.

In forming a surface lamina having the desired arc resistance properties, a suitable sheet of fibrous filler stock such as .010" white rag paper may be initially passed through a varnish containing an appropriate impregnating phenolic resin in an alcohol solvent, for example, straight phenol formaldehyde resin, and also having about six percent (6%) of a flame retardant plasticizer such as triethyl phosphate. After impregnation with the phenolic varnish, the saturated filler is dried by conveying it through an oven at elevated temperature, the resin being partly advanced in polymerization, as previously indicated. For a high grade stock the phenolic resin content of the above stock after the drying operation is preferably within the range of 47% to 50% of the total weight of the impreganted filler. It will be understood that a plurality of sheets of the foregoing stock may be used to form the base or core of a laminate without further treatment, other than that of consolidation by heat and pressure. However, to provide an arc resistant surface lamina for a base of this type this plasticized phenolic resin impregnated sheet stock is next passed through a varnish such as that set forth in the above example, wherein the resin is butylated melamine formaldehyde.

Following this second coating operation, wherein the varnish of the example is employed, the sheet stock is dried by passing it through a second drying oven at a temperature of about 300° F., the volatiles being reduced to between 1.3 to 1.8 percent of the total weight of the impregnated filler. The combined resin content after the drying operation is between 63 to 68 percent by weight, based on the total weight of filler plus resin. To attain a resin content within the foregoing range the rate of travel of the sheet stock through a varnish bath of the type indicated in the example should be approximately twelve inches per minute using a vertical saturator, a heating chamber four feet in length, natural draft, and at a temperature of about 280° F. During the second drying operation the butylated melamine formaldehyde is subjected to a preliminary or partial cure.

It will be appreciated that the example given above is based on a specific type of filler stock and resin. If different filler stocks having greater or lesser degrees of absorbency are used, correspondingly, greater or lesser amounts of resins will be necessary. Additionally, with different phenolic resins, different curing conditions will be required.

In order to form a laminate 9 inches x 15 inches and ⅛ of an inch thick, a build-up weighing 190 grams was made consisting of sufficient base laminae (filler impregnated with plasticized phenolic resin in partially cured state) and one surface lamina on each side thereof comprising filler impregnated with plasticized phenolic resin plus a coating of the butylated melamine formaldehyde resin. Such a build-up was placed between the platens of a press and subjected to a hydraulic pressure of 1000 p. s. i. at a temperature equivalent to 40 pounds steam (285° F.) for 90 minutes. However, at higher temperatures less press time is required. The resultant cured laminate was boardlike in character and provided with smooth top and bottom surfaces.

In testing a completely cured laminate for resistance to arcing the ASTM method No. D–495 was used, whereby a series of increasingly more stringent arcing conditions are applied to the surface of the laminate between two terminals until a direct electrical conducting path is created on the laminate surface between the terminals. In conducting such a test two terminal elements are applied to the laminate surface approximately three-tenths of an inch apart, and an arc is established having a current density of 10 ma. The arc is created and extinguished in accordance with the following test procedure until the current travels directly between the terminals on the surface of the laminate. The time at which this occurs is a measure of the resistance of the laminate to arcing in seconds, (a) For the first minute an interrupted current is employed whereby the arc is established for ¼ second and extinguished for 1¾ seconds. (b) During the next minute the arc is on for ¼ second and off for ¾ of a second. (c) For the third minute the arc is created for ¼ second and extinguished for ¼ second. (d) During the fourth minute the arc is on continuously, and (e) for the fifth minute the current density is raised to 20 ma. and the arc left on continuously.

Under the foregoing test conditions it was found that a laminate produced in accordance with the process described above had an arc resistance of 180 seconds. That is, the arc was maintained under the conditions prescribed for the first three minutes and a breakdown occurred only at the beginning of the fourth minute, wherein the arc was left on continuously. This value of 180 seconds can be compared to results obtained on similar laminates which are formed from fillers impregnated with only a phenolic type resin and without the surface lamina containing butylated melamine formaldehyde in that such laminates have in general been found to break down before the expiration of the first minute when subjected to the above test.

Further, it was found that the laminates of this invention had very good flame resistance and punching qualities without surface cracking.

While there has been described certain exemplary aspects of the invention, the same is only intended to be limited to the following claims.

I claim:

1. A laminate having an average arc resistance of approximately 180 seconds as determined by the ASTM method No. D-495 comprising a plurality of superimposed paper base filler sheets impregnated with a phenolic resin, and wherein the surface lamina is provided with a resinous coating selected from the group consisting of butylated melamine formaldehyde resin, butylated urea formaldehyde resin and mixtures thereof.

2. A laminate of the type described in claim 1 wherein the resinous coating of the surface lamina contains a plasticizing flame retardant.

3. A laminate of the type described in claim 1 wherein the phenolic resin contains a plasticizing flame retardant.

4. A high arc resistant laminate comprising a plurality of superimposed fibrous filler sheets each of which is impregnated with a phenolic resin, and wherein at least one of the outer sheets is provided with a coating comprising polymerized butylated melamine formaldehyde.

5. A process of forming an arc resistant lamina for use as a surface sheet for a multilayer consilidated laminate comprising the steps of impregnating a fibrous sheet with a varnish containing a heat-curable phenolic resin, drying said sheet to remove the volatiles and partially polymerize the phenolic resin, coating the impregnated sheet with a second varnish containing a resin selected from the group consisting of butylated melamine formaldehyde, butylated urea formaldehyde, and mixtures thereof, and drying said coated sheet at elevated temperatures while simultaneously advancing the polymerization of the resin.

6. A process according to claim 5 in which a plasticizing flame retardant is included in both varnishes.

7. A process according to claim 5 wherein the fibrous sheet is a paper base and the second coating varnish comprises butylated melamine formaldehyde resin containing tricresyl phosphate.

8. A high arc resistance laminate comprising a plurality of superimposed fibrous filler sheets each of which is impregnated with a phenolic resin, and wherein at least one of the outer sheets is provided with a coating comprising polymerized butylated melamine formaldehyde containing tricresyl phosphate.

9. Electrical insulation having an average arc resistance of approximately 180 seconds as determined by the ASTM method No. D-495 comprising a paper base impregnated with a phenolic resin and having a surface coating selected from the group consisting of butylated melamine formaldehyde resin, butylated urea formaldehyde resin and mixtures thereof, said coating containing a plasticizing flame retardant.

References Cited in the file of this patent
UNITED STATES PATENTS

| Number | Name | Date |
|---|---|---|
| 2,197,357 | Widmer | Apr. 16, 1940 |
| 2,418,525 | Pollack | Apr. 8, 1947 |
| 2,439,929 | Hill | Apr. 20, 1948 |
| 2,466,457 | Lynn | Apr. 5, 1949 |
| 2,473,463 | Adams | June 14, 1949 |
| 2,582,614 | Wohnsiedler | Jan. 15, 1952 |
| 2,604,427 | Armstrong et al. | July 22, 1952 |
| 2,632,743 | Eckert | Mar. 24, 1953 |
| 2,650,184 | Biefeld | Aug. 25, 1953 |
| 2,656,295 | Locke | Oct. 20, 1953 |
| 2,663,696 | Armatys | Dec. 22, 1953 |